June 11, 1957 J. A. TOEDTMAN 2,795,770
WIRE CLAMP WITH LOW-RESISTANCE LINER
Filed Sept. 21, 1953
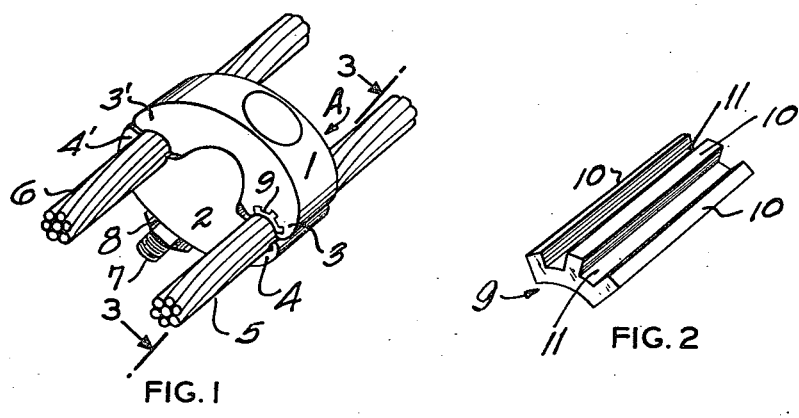
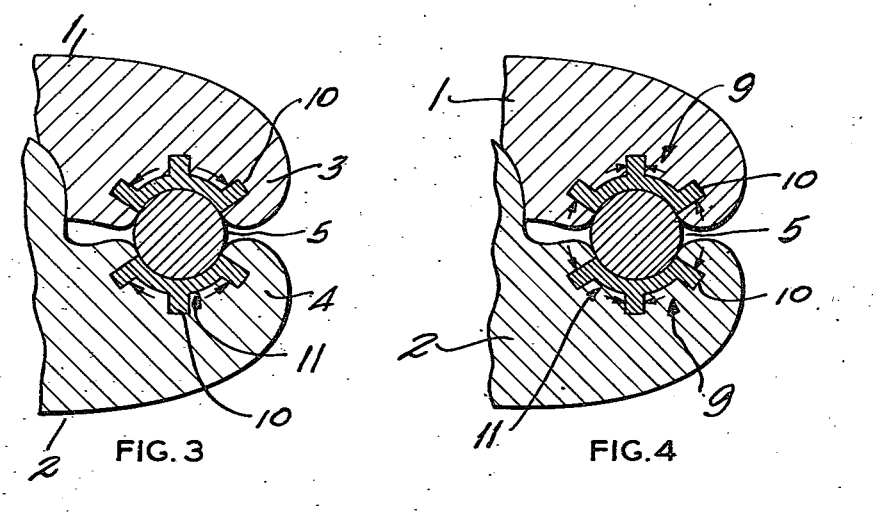
INVENTOR.
John A. Toedtman
BY Rodney Bedell
Atty.

United States Patent Office 2,795,770
Patented June 11, 1957

2,795,770

WIRE CLAMP WITH LOW-RESISTANCE LINER

John A. Toedtman, St. Louis, Mo., assignor to Jasper Blackburn Products Corporation, St. Louis, Mo., a corporation of Missouri Application September 21, 1953, Serial No. 381,317

8 Claims. (Cl. 339—278)

This invention relates in general to wire connectors and, more particularly, to cable clamps having novel means for maintaining low electrical resistance between the clamp body and a cable held therein.

Cable clamps of the so-called "parallel groove" type are customarily made of aluminum alloy and include jaws adapted to hold and connect and provide conductivity between an aluminum cable or wire and a copper cable or wire. It is a common practice to provide the jaws gripping the copper conductor with a copper strip liner to prevent direct contact between the copper cable and the aluminum alloy clamp body and thereby reduce galvanic or local corrosion in the contact area. Such copper strip liners have been mounted upon the pre-formed clamp body by brazing or soldering but these methods of securing the liner have not proved wholly satisfactory for numerous reasons. Foremost is the fact that the high temperature necessary for soldering or brazing has weakened the aluminum alloy. For example, with a copper-aluminum alloy commonly used, having four percent copper, the elevated temperatures of brazing or soldering bring about the formation of copper crystals which have little mutual adhesion and differ substantially from the crystals resulting from proper aging treatment at lower temperatures.

Additionally, soldering and brazing often result in the development of voids or lacunae, within which moisture may collect, and conduce ultimate corrosion. The fluxes regularly used in these procedures electrolyze quite easily so that in the presence of moisture, corrosion is readily facilitated. Common corrosion products cause an increase in bulk tending to fracture the clamp body when in use. Such products may loosen the bond between the liner and body and increase the electrical resistance between the liner and body. Furthermore, since the copper liner and the aluminum alloy clamp body have different coefficients of expansion, the same will tend to pull away from each other under temperature changes and, thus, enhance the electrical resistance therebetween.

Thus, the soldering or brazing of a copper strip liner to an aluminum alloy clamp body has numerous recognized disadvantages, including a relatively high labor cost in production.

It is an object of this invention to provide a cable clamp structure incorporating a pre-formed copper or copper alloy liner member and an aluminum alloy clamp body die cast upon the liner member, whereby the use of intermediate securing agents is obviated.

Another object of this invention is to provide a cable clamp structure wherein the copper liner and aluminum alloy clamp body are adapted for interfitted relationship so that under varying temperatures pressure will be continuously maintained between the contacting faces despite the differences in the respective coefficients of expansion.

Another object of this invention is to provide a cable clamp structure incorporating a copper liner which is so intimately engaged to the clamp body that corrosion creating agents, such as moisture, active gases, salt air particles, etc., cannot penetrate between the liner and body. This avoids a connection burn out which would cause a power line failure. This renders replacement of the clamp unnecessary and results in a greatly increased life of the clamp during which there will be maximum electrical conductivity.

A further object of this invention is to provide a cable clamp with a copper liner member which is so designed as to effect, during production, a rupturing of the oxide film on the aluminum alloy forming the clamp body, whereby increased electrical conductivity is accomplished.

It is an additional object of this invention to provide a pre-formed copper or copper alloy liner for an aluminum alloy clamp with a plating which maintains high conductivity by preventing formation of oxides on the copper liner and, under the heat and pressure of die casting, alloys with the aluminum surface of the body.

These and other detailed objects are attained by the structure illustrated in the accompanying drawings, in which:

Figure 1 is a perspective view of a cable clamp produced in accordance with the present invention.

Figure 2 is a perspective view of the copper liner member.

Figure 3 is a transverse section through the clamp indicating diagrammatically the areas of pressure during rising temperature.

Figure 4 is a similar section indicating the areas of pressure during falling temperature.

In Figure 1, A generally designates cable or wire connector, fabricated of aluminum alloy of the "parallel groove" type comprising interfitting top and bottom body sections 1, 2; top section 1 having a pair of spaced jaw members 3, 3', respectively, for clamping cooperation with complementary jaws 4, 4', formed in bottom section 2. The jaws are of the same dimensions, being thus duplicates of each other. Jaws 3, 4 engage a copper conductor or transmission line 5, while jaws 3', 4' are intended to grip an aluminum conductor 6, which conductors are electrically connected by clamp A. To maintain sections 1, 2 assembled and for their mutual adjustment, there is provided a retaining screw 7 with cooperating nut 8.

Jaws 3, 4 are each provided with a copper or copper alloy liner 9 to avoid direct contact between the copper conductor and the aluminum alloy body of clamp A and so prevent galvanic corrosion at the contact. Jaws 3', 4', are not lined and permit direct surface contact between aluminum conductor 6 and the body of clamp A. Each copper liner member 9 is arcuate in cross section with its concave or outer face opposing copper conductor 5 and has formed on its convex or inner face a series of parallel alternating ribs or ridges 10 and grooves 11 extending throughout the length of the jaw. Although there may be any number of such ribs and grooves, the embodiment of the invention shown in the drawings comprises a pair of side or lateral ribs and a central rib with a pair of intervening grooves.

To produce each clamp section, a copper liner 9, which has been pre-formed, is placed within a die for casting of the section. Molten aluminum alloy is forced under pressure into the die, whereby the section and its associated liner 9 are integrated into a single unit. The molten aluminum alloy will flow into grooves 11 and about ribs 10, exerting a pressure thereagainst on freezing so that the sides of ribs 10 and the bottoms of the grooves are in immediate, air-free surface contact with the aluminum alloy of the related section. The corrugated character of the convex side of liner 9 tends to effect a rupturing of the oxide film which tends to develop on the aluminum alloy cast thereabout, while the formation of an oxide skin on the copper or copper alloy of liner 9 is inhibited by the molten aluminum alloy. Since oxide coatings have a relatively high electrical resistance, the prevention of such oxide in the joint between liner 9 and its associated clamp section insures better conductivity. Since the meeting faces of liner 9 and the clamp sections are sealed off under pressure, corrosion cannot develop between the metals along the corrugations. Consequently, the clamps will not have to be replaced as may be necessary with plate-like copper strip liners soldered to the jaws.

Smooth surfaces of copper and aluminum parts soldered to each other are subject to be pulled away from each other during alternate heating and cooling. By the provisions of the ribs and grooves as shown, the faces of the ribs are thrust towards each other when the article is being heated or cooled.

In expanding under heat, the aluminum alloy of clamp A will spread or swell in directions indicated by the arrows in Figure 3. Under the heat-created expansive force, the aluminum alloy will exert maximum pressure against the inside surfaces of each lateral rib 10, as indicated by arrows in Figure 3, which are thus interposed in the path of expansion. The pressure between ribs 10 and the aluminum alloy assures high electrical conductivity at high temperatures. In a temperature reduction, the aluminum alloy in contraction will withdraw along a path generally shown by the arrows in Figure 4 and will exert pressure against the outward faces of lateral ribs 10 as well as on both sides of the central rib 10 for maintaining high conductivity under low temperatures. Accordingly, effective electrical contact between aluminum alloy sections 1, 2 and liners 9 will be maintained over a relatively extended temperature range, such as from −30° F. to 300° F., as well as during continuous fluctuation within such range.

The formation of clamp A in accordance with the foregoing, prevents any deleterious effect upon the mechanical strength of the aluminum alloy by high temperatures, such as encountered in soldering or brazing. The unique construction of liners 9 and the union thereof with sections 1, 2 reliably provides a consistently low-resistance electric contact throughout an extensive temperature range and inhibits the development of corrosion with consequent reduction in conductivity.

If desired, copper liner 9 may be coated with a metal, such as cadmium or tin, which is preferably applied by electroplating, but may be accomplished by hot dipping. Practice has indicated that maximum results are attained when the plating is in the range of .0003 to .001 inch thick. Incorporation of the plated copper or copper alloy liner 9 in the finished cable clamp is effected in a like manner as above wherein the pre-formed plated liner 9 is placed in a die and the molten aluminum alloy cast thereabout.

During such casting process, the heat of the molten aluminum alloy will tend to fuse the plated metal, as cadmium, resulting in an alloying effect between such metal and the aluminum alloy. This adhesion will prevent the development of oxide film upon the aluminum alloy in those areas wherein the oxide film had not as yet formed or wherein it may have been ruptured during casting. Similarly, the plated metal will also inhibit the formation of oxide upon the liner 9.

With the use of such plating metal, as increased electric conductivity is provided since the resistance of the cadmium or tin and the alloy formed thereby with the aluminum alloy is substantially less than that of the oxide films. Therefore, the cadmium or tin plating arrests the further formation of oxide films and in certain areas wholly prevents same, conducing to a lower electrical resistance between liner 9 and the aluminum alloy clamp body.

In finishing cable clamp A, the cadmium or tin plating, as the case may be, is removed from the transmission line-opposing or concave faces of liners 9 so that a workman can readily visually identify the groove for the copper conductor and that for the aluminum conductor.

The details of construction can be varied without departing from the spirit of the invention and the exclusive use of those modifications coming within the scope of the claims is contemplated.

What is claimed is:

1. An aluminum alloy cable clamp comprising a pair of complementary interfitting sections, each section having a jaw for mutual clamping cooperation, an arcuate liner for each jaw formed of material from the group consisting of copper and copper alloys, the concave side of said liner being presented outwardly, and the inner or convex side of said liner and the adjacent portion of the jaw having a plurality of intermeshed spaced ribs.

2. An aluminum alloy cable clamp comprising a pair of complementary interfitting sections, each section having a jaw for mutual clamping cooperation, an arcuate liner for each jaw formed of material from the group consisting of copper and copper alloys, the concave side of said liner being presented outwardly in surface continuity with the adjacent portions of the clamp body, the inner or convex side of said liner having a plurality of spaced, parallel ribs extending from end to end of said liner, there being grooves in the liner between adjacent pairs of ribs, said liner being in immediate, air-free surface contact on its convex side with said clamp body, the ribs being imbedded within said body.

3. A cable clamp comprising cooperating jaws and a clamping bolt extending through said jaws and provided with a nut for drawing said jaws together, said jaws having opposing arcuate parts for engaging a conductor, each jaw including a body of electricity-conducting metal and a concavo-convex liner of electricity-conducting metal embedded in the jaw body with the concave face of the liner and the corresponding face of the adjacent portion of the jaw body forming a continuous cable engaging surface, said liner being formed of a different material from the jaw body and being spaced from said bolt and having protuberances on its convex side embedded in the material of the jaw body to secure the liner in place and to provide substantially increased current transmitting area between the liner and the jaw body.

4. A cable clamp as described in claim 3 in which the protuberance on the convex side of the liner is elongated in the direction of the axis of the jaw body concavity and extends throughout the length of the jaw body.

5. A cable clamp as described in claim 3 wherein the clamp body is formed of an aluminum alloy and the liner is formed of a material from the group of metals consisting of copper and copper alloys.

6. A cable clamp as described in claim 3 wherein the face of the liner opposing the body of the jaw has a coating of a third electricity-conducting metal.

7. A cable clamp as described in claim 3 wherein the face of the liner opposing the body of the jaw has a thin coating of cadmium.

8. A cable clamp as described in claim 3 wherein the face of the liner opposing the body of the jaw has a thin coating of tin.

References Cited in the file of this patent

UNITED STATES PATENTS

| Number | Name | Date |
|---|---|---|
| 1,807,689 | Deputy | June 2, 1931 |
| 1,875,241 | Idank | Aug. 20, 1932 |
| 1,989,996 | Mantasch | Feb. 5, 1935 |
| 2,004,810 | Hines | June 11, 1935 |
| 2,013,868 | Soderberg | Sept. 10, 1935 |
| 2,190,824 | Cook | Feb. 20, 1940 |
| 2,210,750 | Cook et al. | Aug. 6, 1940 |
| 2,215,416 | Wolcott | Sept. 17, 1940 |
| 2,324,082 | Helm | July 13, 1943 |
| 2,531,162 | Rutherford | Nov. 21, 1950 |
| 2,625,196 | Cooper | Jan. 13, 1953 |

FOREIGN PATENTS

| Number | Country | Date |
|---|---|---|
| 561,661 | Great Britain | May 30, 1944 |
| 661,341 | Great Britain | Nov. 21, 1951 |